(12) United States Patent
Padmarao et al.

(10) Patent No.: US 11,689,022 B2
(45) Date of Patent: Jun. 27, 2023

(54) VOLTAGE CONTROL LOOP FOR MITIGATING FLICKER IN A GRID-FORMING INVERTER-BASED RESOURCE

(71) Applicant: General Electric Renovables Espana, S.L., Barcelona (ES)

(72) Inventors: Veena Padmarao, Bengaluru (IN); Arvind Kumar Tiwari, Niskayuna, NY (US); Subbarao Tatikonda, Bengaluru (IN); Kapil Jha, Bengaluru (IN); Shan Shine, Bengaluru (IN)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/380,564

(22) Filed: Jul. 20, 2021

(65) Prior Publication Data
US 2023/0029185 A1 Jan. 26, 2023

(51) Int. Cl.
*H02J 3/24* (2006.01)
*H02P 21/24* (2016.01)
(Continued)

(52) U.S. Cl.
CPC .................. *H02J 3/24* (2013.01); *G05B 6/02* (2013.01); *H02P 9/10* (2013.01); *H02P 21/24* (2016.02)

(58) Field of Classification Search
CPC ................ H02J 3/24; H02P 21/24; H02P 9/10
See application file for complete search history.

(56) References Cited

U.S. PATENT DOCUMENTS

| 6,437,997 | B1 | 8/2002 | Inarida et al. |
| 2002/0105189 | A1* | 8/2002 | Mikhail ................. F03D 7/043 290/44 |

(Continued)

FOREIGN PATENT DOCUMENTS

| CN | 103780174 A | 5/2014 |
| EP | 1887674 A1 | 2/2008 |

OTHER PUBLICATIONS

The EP Search Report for EP application No. 22182275,2, dated Jan. 16, 2023, 8 pages.

*Primary Examiner* — Sean Gugger
(74) *Attorney, Agent, or Firm* — Dority & Manning, P.A.

(57) ABSTRACT

A method for mitigating voltage disturbances at a point of interconnection (POI) of a grid-forming inverter-based resource (IBR) due to flicker includes receiving a voltage reference command and a voltage feedback. The voltage feedback contains information indicative of the voltage disturbances at the POI due to the flicker. The method also includes determining a power reference signal for the IBR based on the voltage reference command and the voltage feedback. Moreover, the method includes generating a current vector reference signal based on the power reference signal, the current vector reference signal containing a frequency component of the voltage disturbances. Further, the method includes generating a transfer function of a regulator based on the frequency component to account for the flicker effect. In addition, the method includes generating a current vector based on a comparison of the current vector reference signal and a current vector feedback signal. Thus, the method includes regulating a voltage vector command using the current vector to mitigate the voltage disturbances.

15 Claims, 13 Drawing Sheets

(51) Int. Cl.
*G05B 6/02* (2006.01)
*H02P 9/10* (2006.01)

(56) References Cited

U.S. PATENT DOCUMENTS

2007/0216164 A1* 9/2007 Rivas ..................... H02P 9/007
290/44
2011/0101689 A1 5/2011 Larsen et al.

* cited by examiner

VOLTAGE CONTROL LOOP FOR MITIGATING FLICKER IN A GRID-FORMING INVERTER-BASED RESOURCE

FIELD

The present disclosure relates generally to grid-forming power systems, such as wind turbine power systems and more particularly, to a voltage control loop for mitigating flicker in a grid-forming inverter-based resource.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is typically geared to a generator for producing electricity.

Wind turbines can be distinguished in two types: fixed speed and variable speed turbines. Conventionally, variable speed wind turbines are controlled as current sources connected to a power grid. In other words, the variable speed wind turbines rely on a grid frequency detected by a phase locked loop (PLL) as a reference and inject a specified amount of current into the grid. The conventional current source control of the wind turbines is based on the assumptions that the grid voltage waveforms are fundamental voltage waveforms with fixed frequency and magnitude and that the penetration of wind power into the grid is low enough so as to not cause disturbances to the grid voltage magnitude and frequency. Thus, the wind turbines simply inject the specified current into the grid based on the fundamental voltage waveforms. However, with the rapid growth of the wind power, wind power penetration into some grids has increased to the point where wind turbine generators have a significant impact on the grid voltage and frequency. When wind turbines are located in a weak grid, wind turbine power fluctuations may lead to an increase in magnitude and frequency variations in the grid voltage. These fluctuations may adversely affect the performance and stability of the PLL and wind turbine current control.

In addition, the reduction in the proportion of synchronous machines with respect to asynchronous machines, which determine the grid defining parameters voltage and frequency, have contributed to decreasing stability margins. The immediate consequence of the decreased stability margins is a grid collapse when subjected to voltage and frequency disturbances in the grid.

Accordingly, many existing asynchronous machines, such as doubly-fed wind turbine generators, operate in a "grid-following" mode. Grid-following type devices utilize fast current-regulation loops to control active and reactive power exchanged with the grid. More specifically, FIG. 1 illustrates the basic elements of the main circuit and converter control structure for a grid-following doubly-fed wind turbine generator. As shown, the active power reference to the converter is developed by the energy source regulator, e.g., the turbine control portion of a wind turbine. This is conveyed as a torque reference which represents the lesser of the maximum attainable power from the energy source at that instant, or a curtailment command from a higher-level grid controller. The converter control then determines a current reference for the active component of current to achieve the desired torque. Accordingly, the doubly-fed wind turbine generator includes functions that manage the voltage and reactive power in a manner that results in a command for the reactive component of current. Wide-bandwidth current regulators then develop commands for voltage to be applied by the converters to the system, such that the actual currents closely track the commands.

Alternatively, grid-forming type converters provide a voltage-source characteristic, where the angle and magnitude of the voltage are controlled to achieve the regulation functions needed by the grid. With this structure, current will flow according to the demands of the grid while the converter contributes to establishing a voltage and frequency for the grid. This characteristic is comparable to conventional generators based on a turbine driving a synchronous machine. Thus, a grid-forming source must include the following basic functions: (1) support grid voltage and frequency for any current flow within the rating of the equipment, both real and reactive; (2) prevent operation beyond equipment voltage or current capability by allowing grid voltage or frequency to change rather than disconnecting equipment (disconnection is allowed only when voltage or frequency are outside of bounds established by the grid entity); (3) remain stable for any grid configuration or load characteristic, including serving an isolated load or connected with other grid-forming sources, and switching between such configurations; (4) share total load of the grid among other grid-forming sources connected to the grid; (5) ride through grid disturbances, both major and minor, and (6) meet requirements (1)-(5) without requiring fast communication with other control systems existing in the grid, or externally-created logic signals related to grid configuration changes.

The basic control structure to achieve the above grid-forming objectives was developed and field-proven for battery systems in the early 1990's (see e.g., U.S. Pat. No. 5,798,633 entitled "Battery Energy Storage Power Conditioning System"). Applications to full-converter wind generators and solar generators are disclosed in U.S. Pat. No. 7,804,184 entitled "System and Method for Control of a Grid Connected Power Generating System," and U.S. Pat. No. 9,270,194 entitled "Controller for controlling a power converter." Applications to grid-forming control for a doubly-fed wind turbine generator are disclosed in PCT/US2020/013787 entitled "System and Method for Providing Grid-Forming Control for a Double-Feb Wind Turbine Generator."

As an example, FIG. 2 illustrates a schematic diagram of one embodiment of a main circuit of a grid-forming system. As shown, the main circuit includes a power-electronic converter with connections on DC and AC sides. This converter receives gating commands from a controller that creates an AC voltage phasor Vcnv at an angle of Thvcnv. The angle is with respect to a reference phasor having a fixed frequency. The DC side is supplied with a device capable of generating or absorbing power for even a short duration. Such devices may include, for example, batteries, solar panels, rotating machines with a rectifier, or capacitors. In addition, as shown, the circuit includes an inductive impedance Xcnv connecting the converter to its point of interconnection, shown as the voltage Vt and angle ThVt in FIG. 2.

The electrical system behind the point of interconnect is shown as a Thevenin equivalent with impedance Zthev and voltage Vthev at angle ThVthev. This equivalent can be used to represent any circuit, including grid-connected and islanded circuits with loads. In practical situations, the impedance Zthev will be primarily inductive.

Still referring to FIG. 2, the closed-loop portion of the main control receives feedback signals from the voltage and current at the point of interconnection. Additional inputs are received from higher-level controls (not shown). While FIG. 2 illustrates a single converter as an example, any grouping of equipment that can create an electrical equivalent of a controlled voltage Vcnv behind an impedance Xcnv can have the control schemes disclosed applied to achieve the same performance benefits.

Referring now to FIG. 3, a control diagram for providing grid-forming control (GFC) according to conventional construction is illustrated. As shown, a converter controller 1 receives references (e.g., Vref and Pref) and limits (e.g., VcmdLimits and PcmdLimits) from higher-level controls 2. These high-level limits are on physical quantities of voltage, current, and power. The main regulators include a fast voltage regulator 3 and a slow power regulator 4. These regulators 3, 4 have final limits applied to the converter control commands for voltage magnitude (e.g., VcnvCmd) and angle (e.g., $\theta_{Pang}$ and $\theta_{PLL}$) to implement constraints on reactive- and real-components of current, respectively. Further, such limits are based upon a pre-determined fixed value as a default, with closed-loop control to reduce the limits should current exceed limits.

For some GFC power systems, voltage disturbances arising at the point of interconnection can occur. Such disturbances are often referred to as flicker. Thus, the term "flicker" as used herein generally refers to disturbances and/or variations in current or voltage at the point of interconnection that are perceptible at certain frequencies (e.g., from about 1 Hertz (Hz) to about 30 Hz). Oftentimes, grid requirements prohibit connection to the power grid if flicker is present in a certain amount.

Accordingly, the present disclosure is directed to systems and methods for controlling and mitigating the voltage disturbances arising at the point of interconnection of a grid forming power system, such as a wind turbine power system, due to flicker.

BRIEF DESCRIPTION

Aspects and advantages of the invention will be set forth in part in the following description, or may be obvious from the description, or may be learned through practice of the invention.

In one aspect, the present disclosure is directed to a method for mitigating voltage disturbances at a point of interconnection of a grid-forming inverter-based resource connected to a power grid due to a flicker effect. The method includes receiving, via a controller, a voltage reference command and a voltage feedback from an external controller. The voltage feedback contains information indicative of the voltage disturbances at the point of interconnection due to the flicker effect. The method also includes determining, via the controller, a power reference signal for the inverter-based resource based on the voltage reference command and the voltage feedback. Moreover, the method includes generating, via the controller, a current vector reference signal based on the power reference signal, the current vector reference signal containing a frequency component of the voltage disturbances. Further, the method includes generating a transfer function of a regulator of the controller based on the frequency component to account for the flicker effect. In addition, the method includes generating, via the controller, a current vector based on a comparison of the current vector reference signal and a current vector feedback signal. Thus, the method includes regulating, via the regulator, a voltage vector command using the current vector to mitigate the voltage disturbances at the point of interconnection.

In an embodiment, the method may further include dynamically adjusting the transfer function of the regulator of the controller based on the frequency component. In another embodiment, the grid-forming inverter-based resource may be a power converter. Thus, in an embodiment, the controller may be a converter controller of the power converter.

In another embodiment, the converter controller may include a voltage control loop and a frequency control loop. In such embodiments, the voltage control loop corresponds to d-axis current control and the frequency control loop corresponds to q-axis control.

In further embodiments, the voltage control loop of the converter controller may include a d-axis power proportional-integral regulator and a d-axis current proportional-integral regulator. Thus, in an embodiment, dynamically adjusting the transfer function of the controller based on the frequency component may include adjusting the transfer function of the d-axis current proportional-integral regulator based on the frequency component.

In additional embodiments, dynamically adjusting the transfer function of the controller based on the frequency component may include adjusting the transfer function of the d-axis current proportional-integral regulator from a proportional-integral regulator to a proportional-resonant regulator.

In several embodiments, the method further includes tracking, via the d-axis current proportional-integral regulator, the frequency component of the voltage disturbances. Thus, in an embodiment, the method may also include dynamically adjusting the transfer function of the controller based on changes in the frequency component of the voltage disturbances.

In particular embodiments, the method may include determining, via the converter controller, one or more voltage control commands for the power converter by rotating a d-q reference frame of the current vector back to an a-b-c reference frame using a phasor angle.

In still further embodiments, the grid-forming inverter-based resource may be part of a wind turbine power system. In such embodiments, the power converter includes a rotor-side converter and a line-side converter. Furthermore, in an embodiment, the method may include sending the one or more voltage control commands to the rotor-side converter.

In certain embodiments, the power reference signal may be a reactive power reference signal or an active power reference signal.

In another aspect, the present disclosure is directed to a method for mitigating voltage disturbances at a point of interconnection of a grid-forming inverter-based resource connected to a power grid due to a flicker effect. The method includes receiving, via a controller, a voltage feedback from an external controller. Further, the method includes generating, via the controller, a current vector reference signal based on the voltage feedback. The current vector reference signal contains a frequency component of the voltage disturbances. The method also includes dynamically adjusting a transfer function of a regulator of the controller based on the frequency component to account for the flicker effect.

Moreover, in an embodiment, the method may include regulating, via the regulator, a voltage vector command of the grid-forming inverter-based resource to mitigate the voltage disturbances at the point of interconnection. It should be understood that the method may further include any of the additional features and/or steps described herein.

In yet another aspect, the present disclosure is directed to a system for mitigating voltage disturbances at a point of interconnection of a grid-forming inverter-based resource connected to a power grid due to a flicker effect. The system includes a controller having a proportional-integral regulator. The controller includes a processor for performing a plurality of operations, including but not limited to receiving a voltage feedback from an external controller, generating a current vector reference signal based on the voltage feedback, the current vector reference signal containing a frequency component of the voltage disturbances, and generating a transfer function of the proportional-integral regulator based on the frequency component to account for the flicker effect. Further, the regulator of the controller regulates a voltage vector command of the grid-forming inverter-based resource to mitigate the voltage disturbances at the point of interconnection. It should be understood that the system may further include any of the additional features and/or steps described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
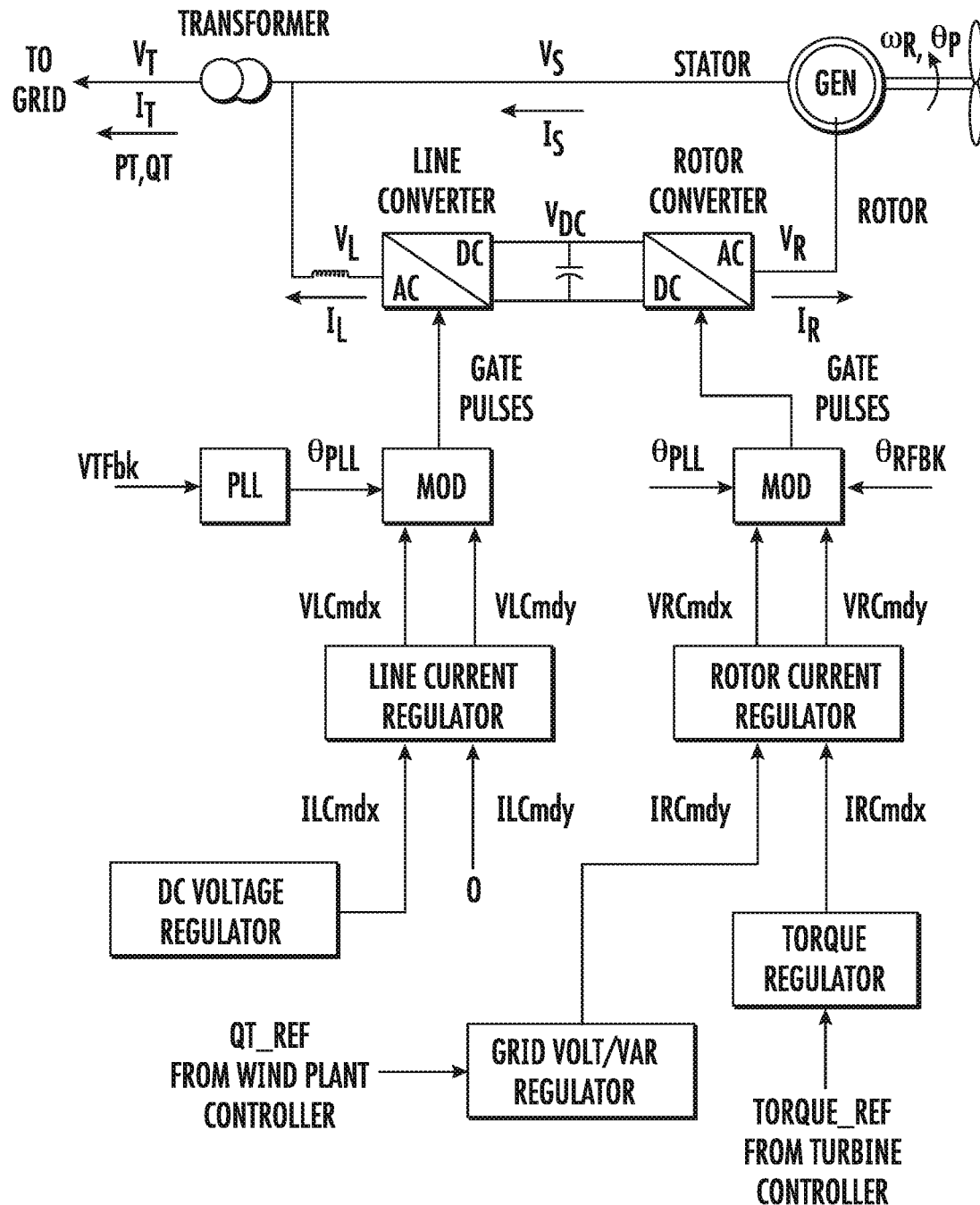
FIG. 1 illustrates a one-line diagram of a doubly-fed wind turbine generator with structure of converter controls for grid-following application according to conventional construction.
Figure 2:
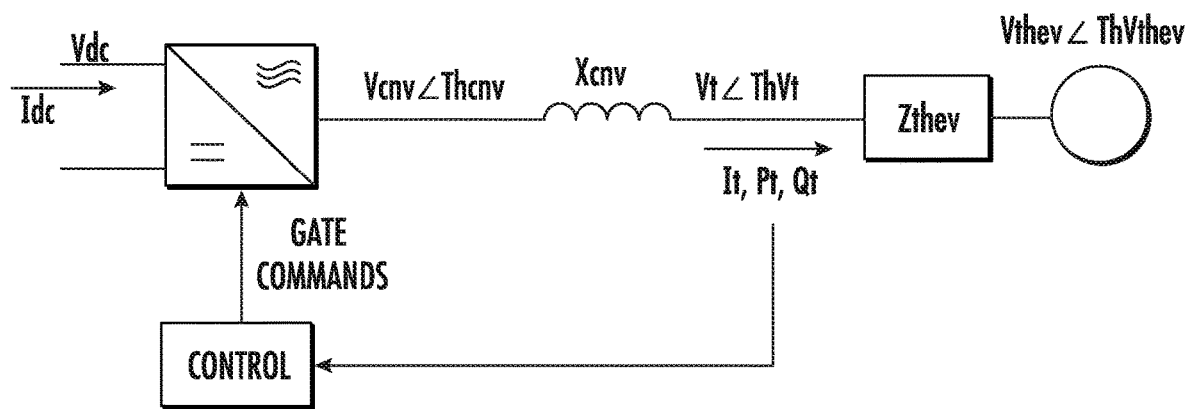
FIG. 2 illustrates a schematic diagram of one embodiment of a main circuit of a grid-forming system according to conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present disclosure is directed to systems and methods for operating a grid forming inverter-based resource. As used herein, inverter-based resources generally refer to electrical devices that can generate or absorb electric power through switching of power-electronic devices. Accordingly, inverter-based resource may include wind turbine generators, solar inverters, energy-storage systems, STATCOMs, or hydro-power systems. For example, in one embodiment, the inverter-based resource may be a wind turbine power system having a rotor-side converter, a line-side converter, and a doubly-fed induction generator (DFIG) connected to the power grid. The grid forming control of an inverter-based resource is built primarily around the voltage control loop and the frequency control loop. The voltage disturbances due to the flicker effect are fed back to the voltage control loop. Accordingly, the present disclosure is directed to a dynamic controller of the voltage control loop that is dynamically adjusted based on a frequency component present to mitigate the flicker effect.

Figure 4:
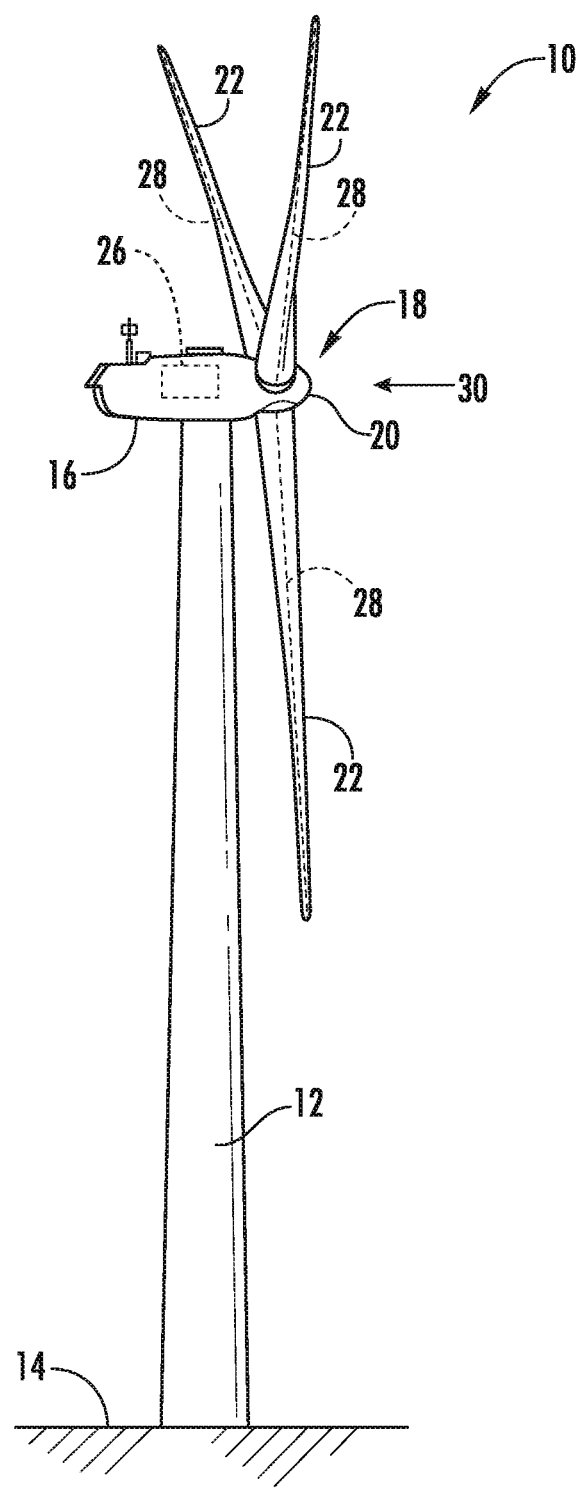
FIG. 4 illustrates a perspective view of one embodiment of a wind turbine according to the present disclosure.

Referring now to the drawings, FIG. 4 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 5) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 5:
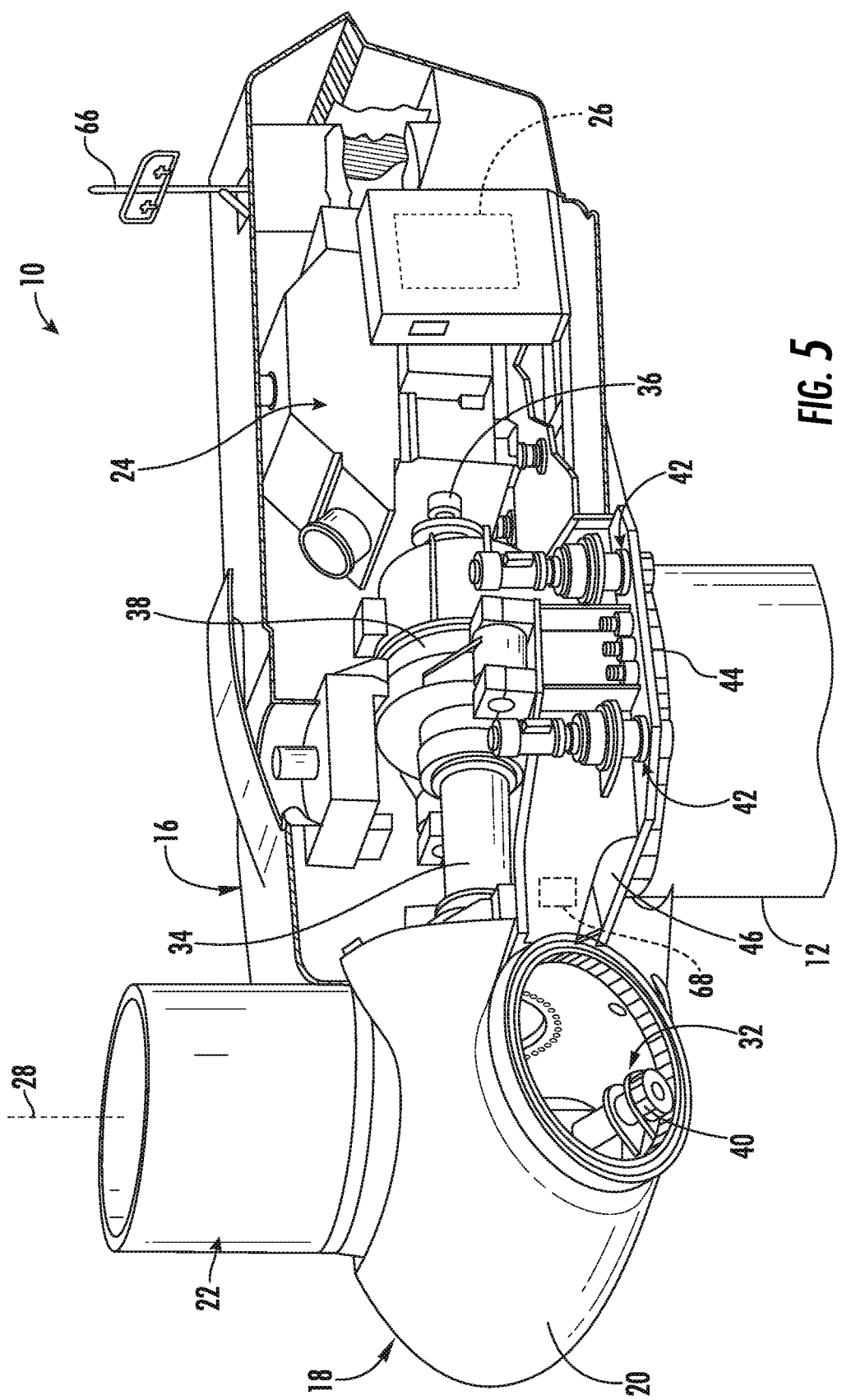
FIG. 5 illustrates a simplified, internal view of one embodiment of a nacelle according to the present disclosure.

Referring now to FIG. 5, a simplified, internal view of one embodiment of the nacelle 16 of the wind turbine 10 shown in FIG. 4 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction 52, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 6:
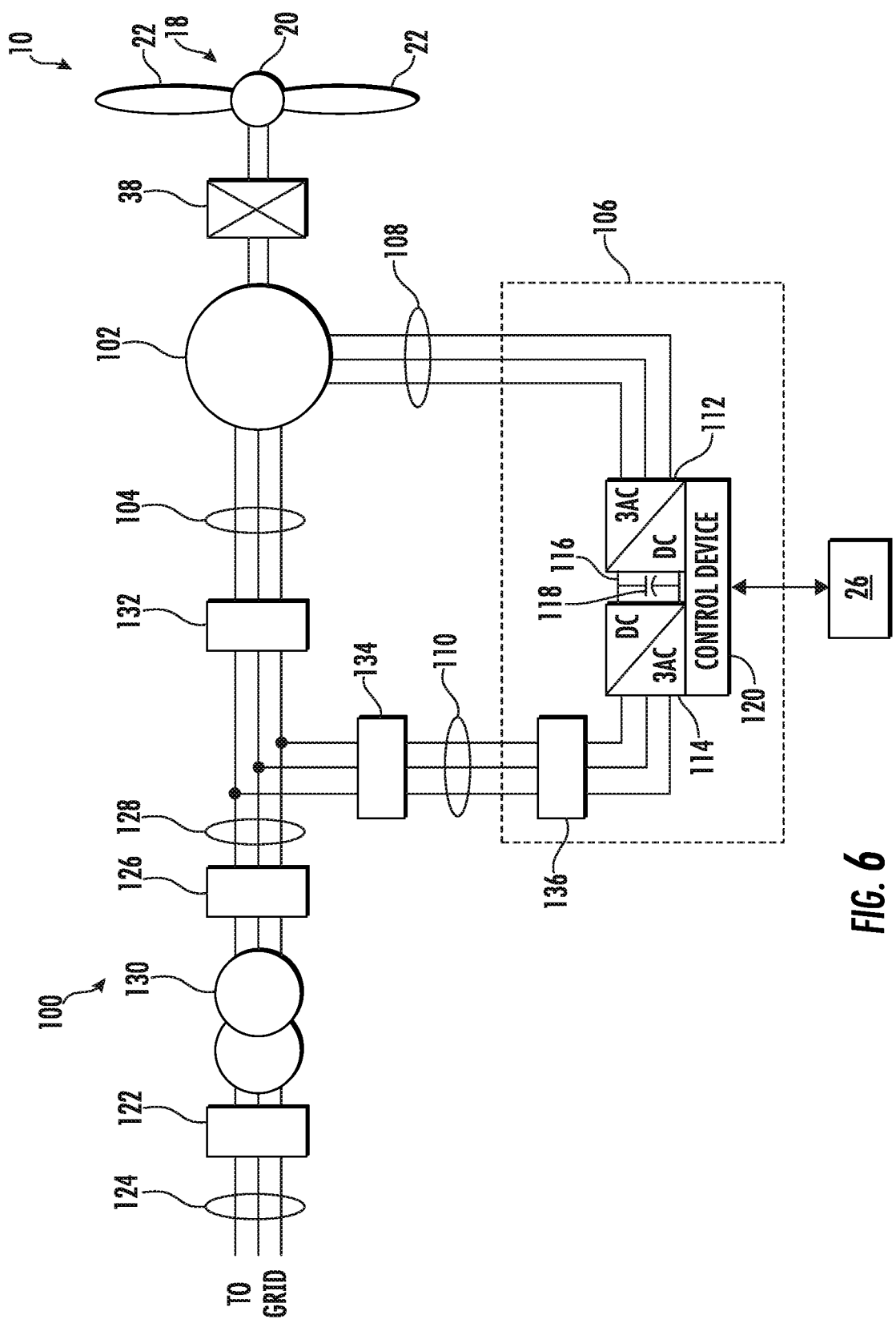
FIG. 6 illustrates a schematic diagram of one embodiment of a wind turbine electrical power system suitable for use with the wind turbine shown in FIG. 1.

Referring now to FIG. 6, a schematic diagram of one embodiment of a wind turbine power system 100 is illustrated in accordance with aspects of the present disclosure. Although the present disclosure will generally be described herein with reference to the wind turbine 10 shown in FIG. 4, those of ordinary skill in the art, using the disclosures provided herein, should understand that aspects of the present disclosure may also be applicable in other power generation systems, and, as mentioned above, that the invention is not limited to wind turbine systems.

In the embodiment of FIG. 6 and as mentioned, the rotor 18 of the wind turbine 10 (FIG. 4) may, optionally, be coupled to the gearbox 38, which is, in turn, coupled to a generator 102, which may be a doubly fed induction generator (DFIG). As shown, the DFIG 102 may be connected to a stator bus 104. Further, as shown, a power converter 106 may be connected to the DFIG 102 via a rotor bus 108, and to the stator bus 104 via a line-side bus 110. As such, the stator bus 104 may provide an output multiphase power (e.g., three-phase power) from a stator of the DFIG 102, and the rotor bus 108 may provide an output multiphase power (e.g., three-phase power) from a rotor of the DFIG 102. The power converter 106 may also include a rotor-side converter (RSC) 112 and a line-side converter (LSC) 114. The DFIG 102 is coupled via the rotor bus 108 to the rotor-side converter 112. Additionally, the RSC 112 is coupled to the LSC 114 via a DC link 116 across which is a DC link capacitor 118. The LSC 114 is, in turn, coupled to the line-side bus 110.

The RSC 112 and the LSC 114 may be configured for normal operating mode in a three-phase, pulse width modulation (PWM) arrangement using one or more switching devices, such as insulated gate bipolar transistor (IGBT) switching elements. In addition, the power converter 106 may be coupled to a converter controller 120 in order to control the operation of the rotor-side converter 112 and/or the line-side converter 114 as described herein. It should be noted that the converter controller 120 may be configured as an interface between the power converter 106 and the turbine controller 26 and may include any number of control devices.

In typical configurations, various line contactors and circuit breakers including, for example, a grid breaker 122 may also be included for isolating the various components as necessary for normal operation of the DFIG 102 during connection to and disconnection from a load, such as the electrical grid 124. For example, a system circuit breaker 126 may couple a system bus 128 to a transformer 130, which may be coupled to the electrical grid 124 via the grid breaker 122. In alternative embodiments, fuses may replace some or all of the circuit breakers.

In operation, alternating current power generated at the DFIG 102 by rotating the rotor 18 is provided to the electrical grid 124 via dual paths defined by the stator bus 104 and the rotor bus 108. On the rotor bus side 108, sinusoidal multi-phase (e.g., three-phase) alternating current (AC) power is provided to the power converter 106. The rotor-side converter 112 converts the AC power provided from the rotor bus 108 into direct current (DC) power and provides the DC power to the DC link 116. As is generally understood, switching elements (e.g., IGBTs) used in the bridge circuits of the rotor-side converter 112 may be modulated to convert the AC power provided from the rotor bus 108 into DC power suitable for the DC link 116.

In addition, the line-side converter 114 converts the DC power on the DC link 116 into AC output power suitable for the electrical grid 124. In particular, switching elements (e.g., IGBTs) used in bridge circuits of the line-side converter 114 can be modulated to convert the DC power on the DC link 116 into AC power on the line-side bus 110. The AC power from the power converter 106 can be combined with the power from the stator of DFIG 102 to provide multi-phase power (e.g., three-phase power) having a frequency maintained substantially at the frequency of the electrical grid 124 (e.g., 50 Hz or 60 Hz).

Additionally, various circuit breakers and switches, such as grid breaker 122, system breaker 126, stator sync switch 132, converter breaker 134, and line contactor 136 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 106 may receive control signals from, for instance, the local control system 176 via the converter controller 120. The control signals may be based, among other things, on sensed states or operating characteristics of the wind turbine power system 100. Typically, the control signals provide for control of the operation of the power converter 106. For example, feedback in the form of a sensed speed of the DFIG 102 may be used to control the conversion of the output power from the rotor bus 108 to maintain a proper and balanced multi-phase (e.g., three-phase) power supply. Other feedback from other sensors may also be used by the controller(s) 120, 26 to control the power converter 106, including, for example, stator and rotor bus voltages and current feedbacks. Using the various forms of feedback information, switching control signals (e.g., gate timing commands for IGBTs), stator synchronizing control signals, and circuit breaker signals may be generated.

The power converter 106 also compensates or adjusts the frequency of the three-phase power from the rotor for changes, for example, in the wind speed at the hub 20 and the rotor blades 22. Therefore, mechanical and electrical rotor frequencies are decoupled and the electrical stator and rotor frequency matching is facilitated substantially independently of the mechanical rotor speed.

Under some states, the bi-directional characteristics of the power converter 106, and specifically, the bi-directional characteristics of the LSC 114 and RSC 112, facilitate feeding back at least some of the generated electrical power into generator rotor. More specifically, electrical power may be transmitted from the stator bus 104 to the line-side bus 110 and subsequently through the line contactor 136 and into the power converter 106, specifically the LSC 114 which acts as a rectifier and rectifies the sinusoidal, three-phase AC power to DC power. The DC power is transmitted into the DC link 116. The capacitor 118 facilitates mitigating DC link voltage amplitude variations by facilitating mitigation of a DC ripple sometimes associated with three-phase AC rectification.

The DC power is subsequently transmitted to the RSC 112 that converts the DC electrical power to a three-phase, sinusoidal AC electrical power by adjusting voltages, currents, and frequencies. This conversion is monitored and controlled via the converter controller 120. The converted AC power is transmitted from the RSC 112 via the rotor bus 108 to the generator rotor. In this manner, generator reactive power control is facilitated by controlling rotor current and voltage.

Figure 7:
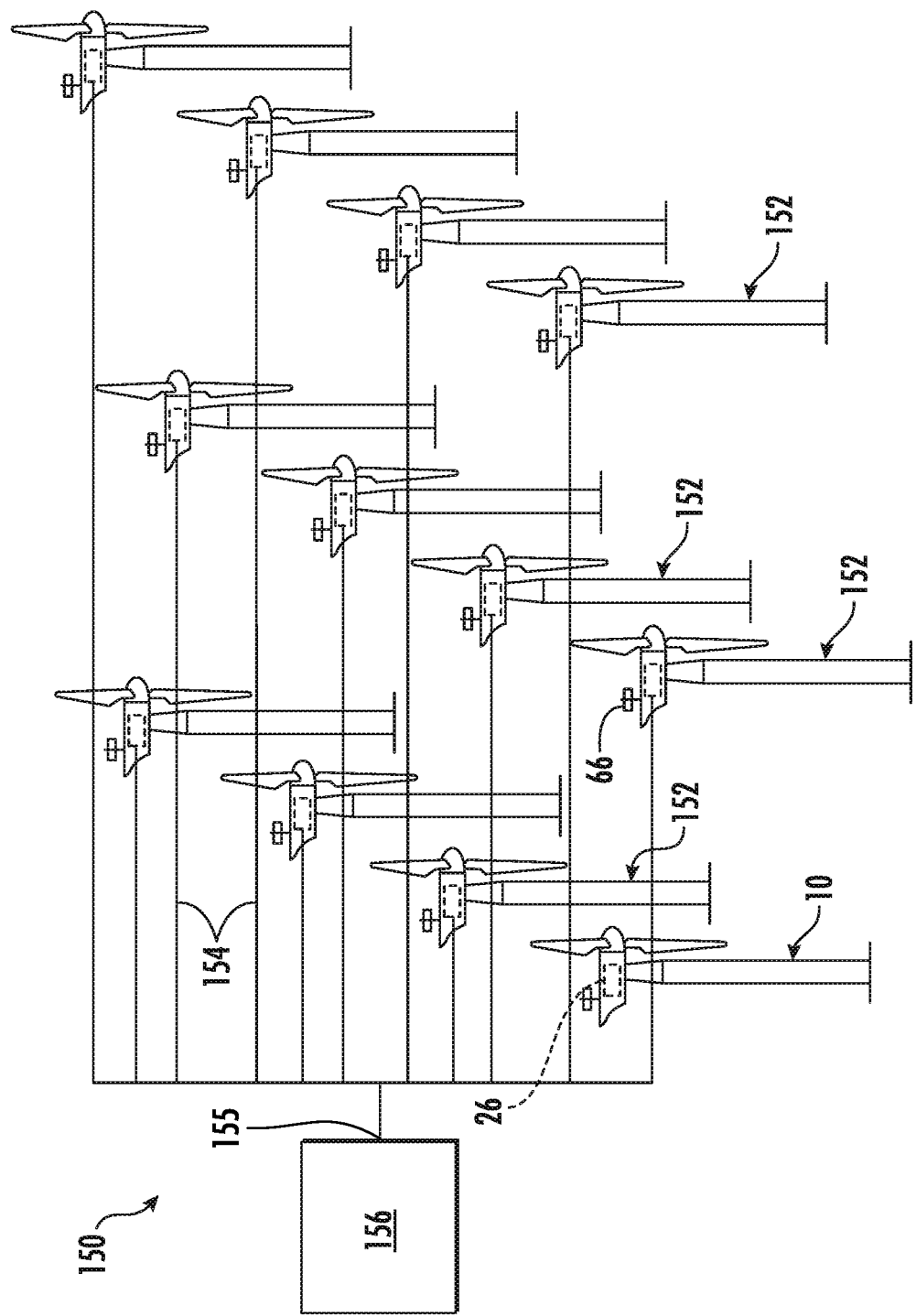
FIG. 7 illustrates a schematic diagram of one embodiment of a wind farm having a plurality of wind turbines according to the present disclosure.

Referring now to FIG. 7, the wind turbine power system 100 described herein may be part of a wind farm 150. As shown, the wind farm 150 may include a plurality of wind turbines 52 connected to the power grid at a point of interconnection 155, including the wind turbine 10 described above, and an overall farm-level controller 156. For example, as shown in the illustrated embodiment, the wind farm 150 includes twelve wind turbines, including wind turbine 10. However, in other embodiments, the wind farm 150 may include any other number of wind turbines, such as less than twelve wind turbines or greater than twelve wind turbines. In one embodiment, the turbine controllers of the plurality of wind turbines 152 are communicatively coupled to the farm-level controller 156, e.g., through a wired connection, such as by connecting the turbine controller 26 through suitable communicative links 154 (e.g., a suitable cable). Alternatively, the turbine controllers may be communicatively coupled to the farm-level controller 156 through a wireless connection, such as by using any suitable wireless communications protocol known in the art. In further embodiments, the farm-level controller 156 is configured to send and receive control signals to and from the various wind turbines 152, such as for example, distributing real and/or reactive power demands across the wind turbines 152 of the wind farm 150.

Figure 8:
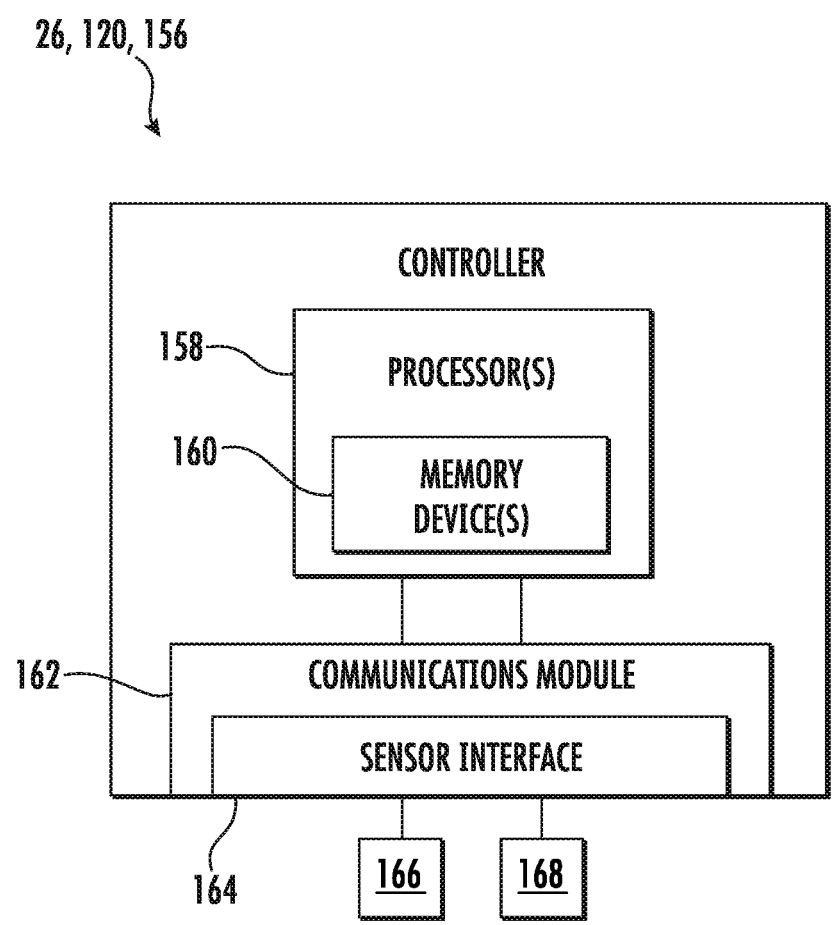
FIG. 8 illustrates a block diagram of one embodiment of a controller according to the present disclosure.

Referring now to FIG. 8, a block diagram of one embodiment of suitable components that may be included within the controller (such as any one of the converter controller 120, the turbine controller 26, and/or the farm-level controller 156 described herein) in accordance with example aspects of the present disclosure is illustrated. As shown, the controller may include one or more processor(s) 158, computer, or other suitable processing unit and associated memory device(s) 160 that may include suitable computer-readable instructions that, when implemented, configure the controller to perform various different functions, such as receiving, transmitting and/or executing wind turbine control signals (e.g., performing the methods, steps, calculations and the like disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 160 may generally include memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements.

Such memory device(s) 160 may generally be configured to store suitable computer-readable instructions that, when implemented by the processor(s) 158, configure the controller to perform various functions as described herein. Additionally, the controller may also include a communications interface 162 to facilitate communications between the controller and the various components of the wind turbine 10. An interface can include one or more circuits, terminals, pins, contacts, conductors, or other components for sending and receiving control signals. Moreover, the controller may include a sensor interface 164 (e.g., one or more analog-to-digital converters) to permit signals transmitted from the sensors 166, 168 to be converted into signals that can be understood and processed by the processor(s) 158.

Figure 9:
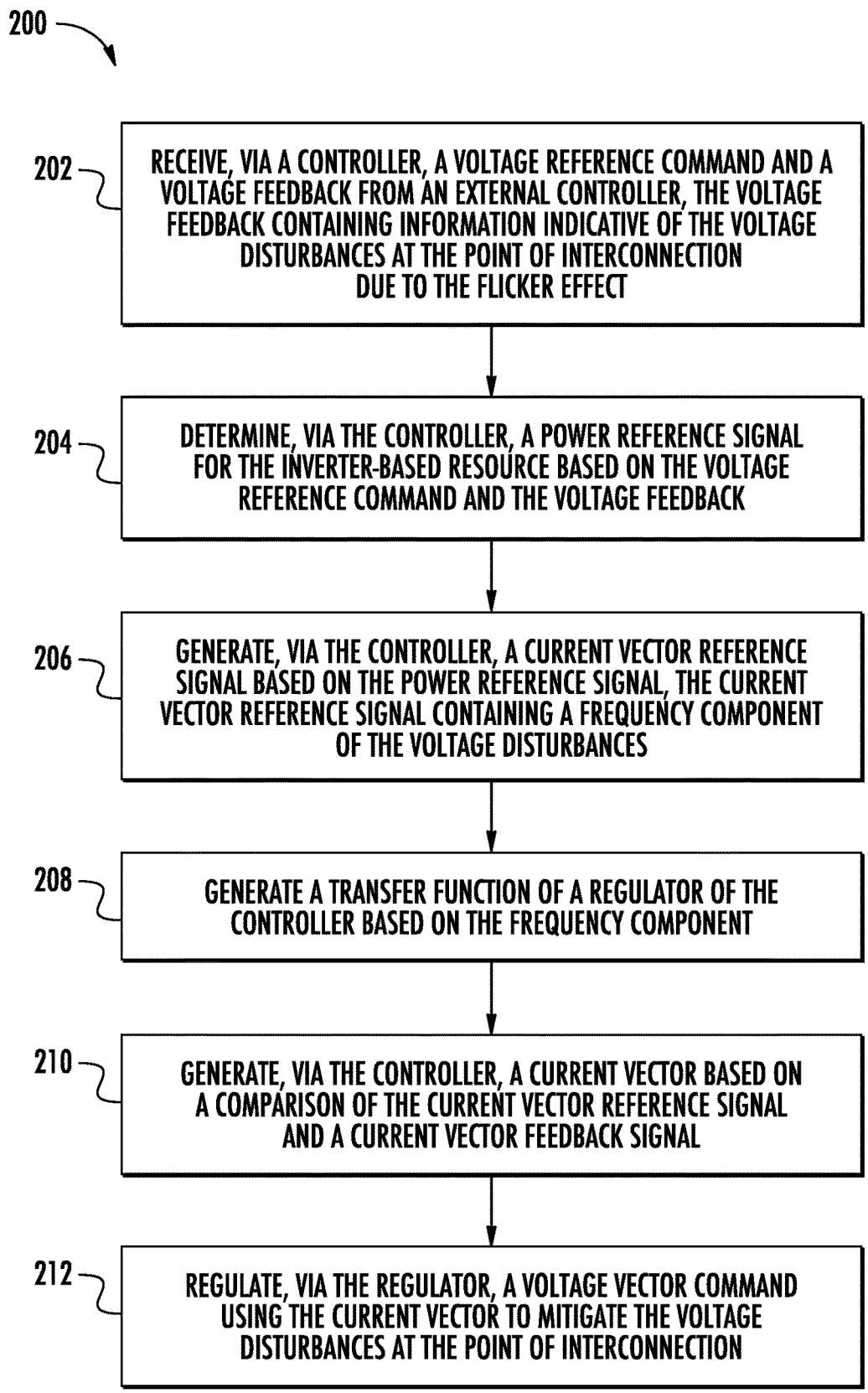
FIG. 9 illustrates a flow diagram of one embodiment of method for mitigating voltage disturbances at a point of interconnection of a grid-forming inverter-based resource connected to a power grid due to a flicker effect according to the present disclosure.

Referring now to FIG. 9, a flow diagram of one embodiment of a method 200 for mitigating voltage disturbances at a point of interconnection of a grid-forming inverter-based resource connected to a power grid due to a flicker effect is provided. In an embodiment, for example, the inverter-based resource may be a power converter of a wind turbine power system, such as the power converter 106 in FIG. 6. In general, the method 200 is described herein with reference to the wind turbine power system 100 of FIGS. 4-8. However, it should be appreciated that the disclosed method 200 may be implemented with any other suitable power generation systems having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 includes receiving, via a controller, a voltage reference command and a voltage feedback from an external controller. As an initial matter, in particular embodiments, the controller described herein may include the turbine controller 26 or the converter controller 120 of the wind turbine power system 100. For example, in an embodiment, the method 200 may include receiving of the voltage reference command from the external controller in response to a deviation in voltage in the power grid. Accordingly, in an embodiment, the voltage feedback contains information indicative of the voltage disturbances at the point of interconnection due to the flicker effect.

As shown at (204), the method 200 includes determining, via the controller, a power reference signal for the inverter-based resource based on the voltage reference command and the voltage feedback. For example, in certain embodiments, the power reference signal may be a reactive power reference signal or an active power reference signal.

As shown at (206), the method 200 includes generating, via the controller, a current vector reference signal based on the power reference signal, the current vector reference signal containing a frequency component of the voltage disturbances. As shown at (208), the method 200 includes generating a transfer function of a regulator of the controller based on the frequency component to account for the flicker effect. Furthermore, in an embodiment, the method 200 may include dynamically adjusting the transfer function of the regulator of the controller based on the frequency component. As shown at (210), the method 200 includes generating, via the controller, a current vector based on a comparison of the current vector reference signal and a current vector feedback signal. As shown at (212), the method 200 includes regulating, via the regulator, a voltage vector command using the current vector to mitigate the voltage disturbances at the point of interconnection.

Figure 3:
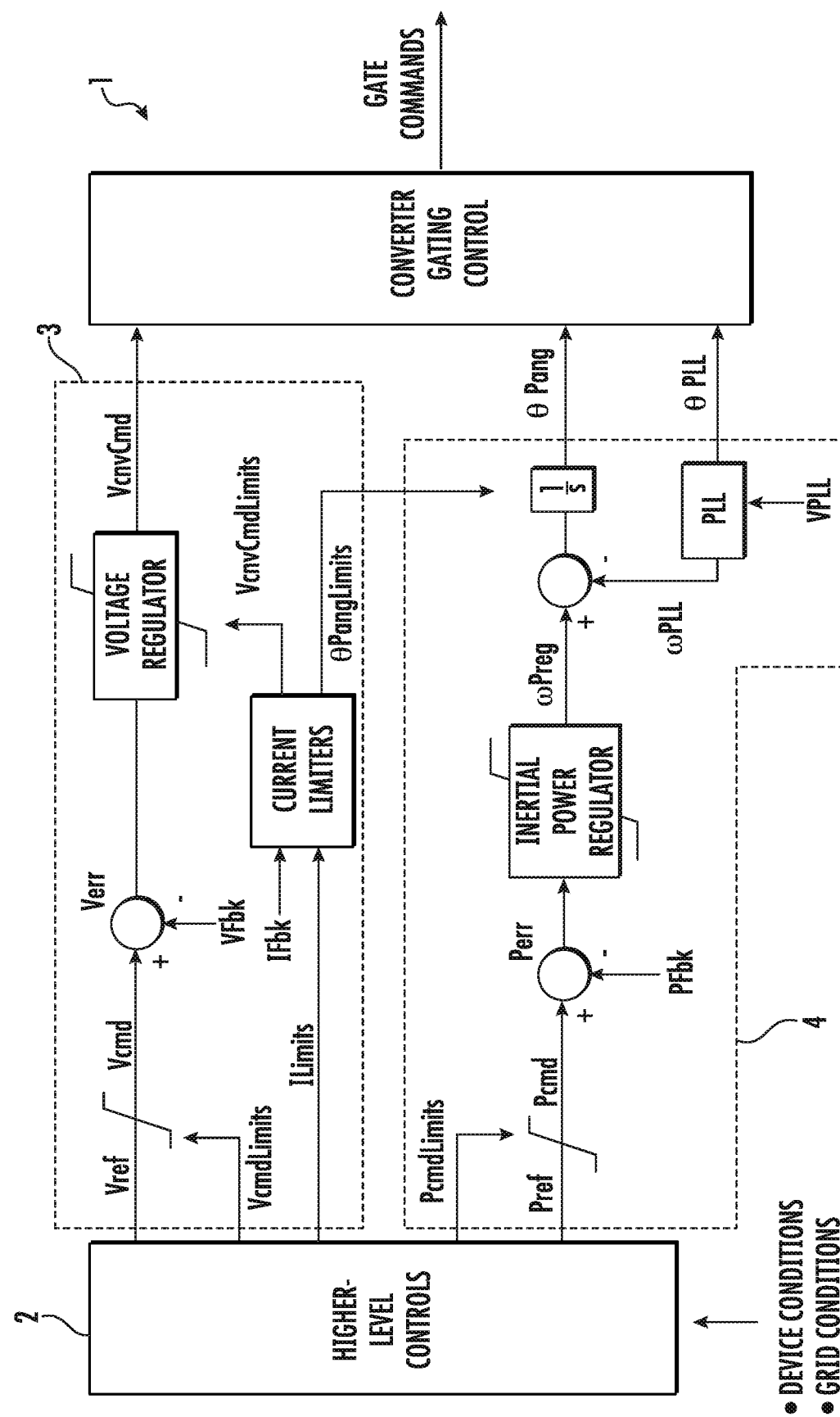
FIG. 3 illustrates a control diagram for providing grid-forming control according to conventional construction.
Figure 10:
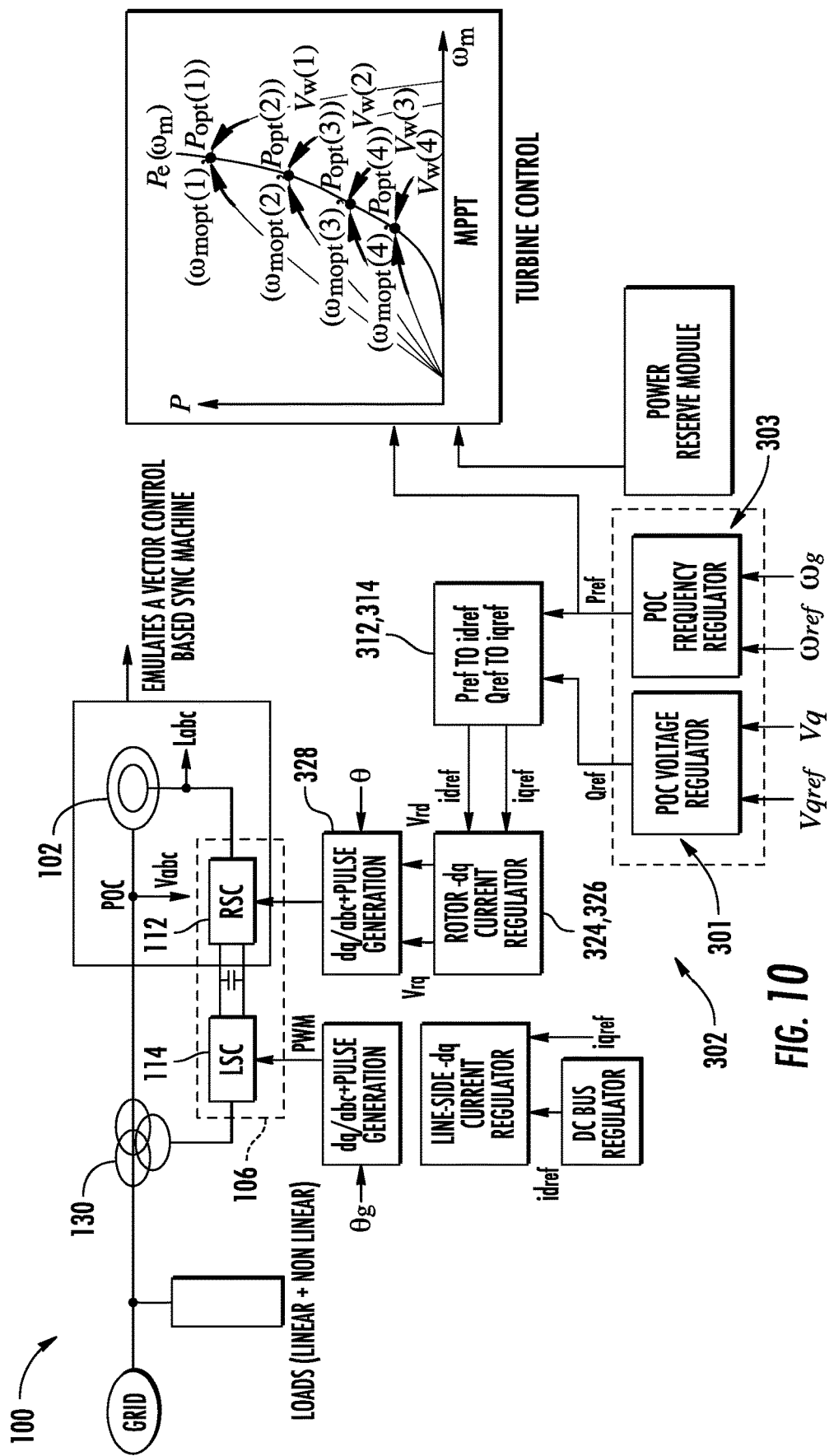
FIG. 10 illustrates a schematic diagram of one embodiment of a grid-forming wind turbine electrical power system according to the present disclosure, particularly illustrating a voltage control loop of the power converter mitigating voltage disturbances at a point of interconnection thereof.
Figure 11:
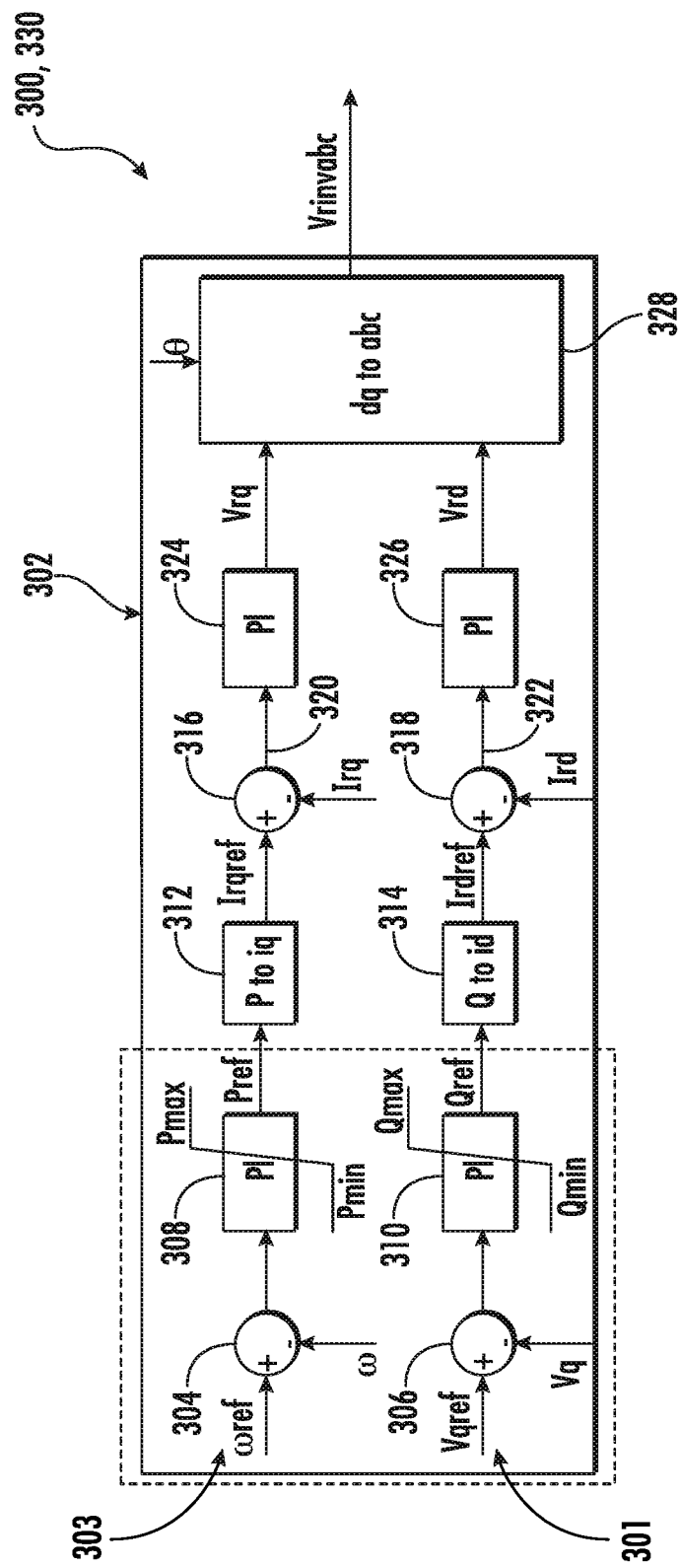
FIG. 11 illustrates a schematic diagram of one embodiment of a system for operating at least one inverter-based resource to provide grid-forming control of the inverter-based resource according to the present disclosure, particularly illustrating a voltage control loop of the power converter mitigating voltage disturbances at a point of interconnection thereof.
Figure 12:
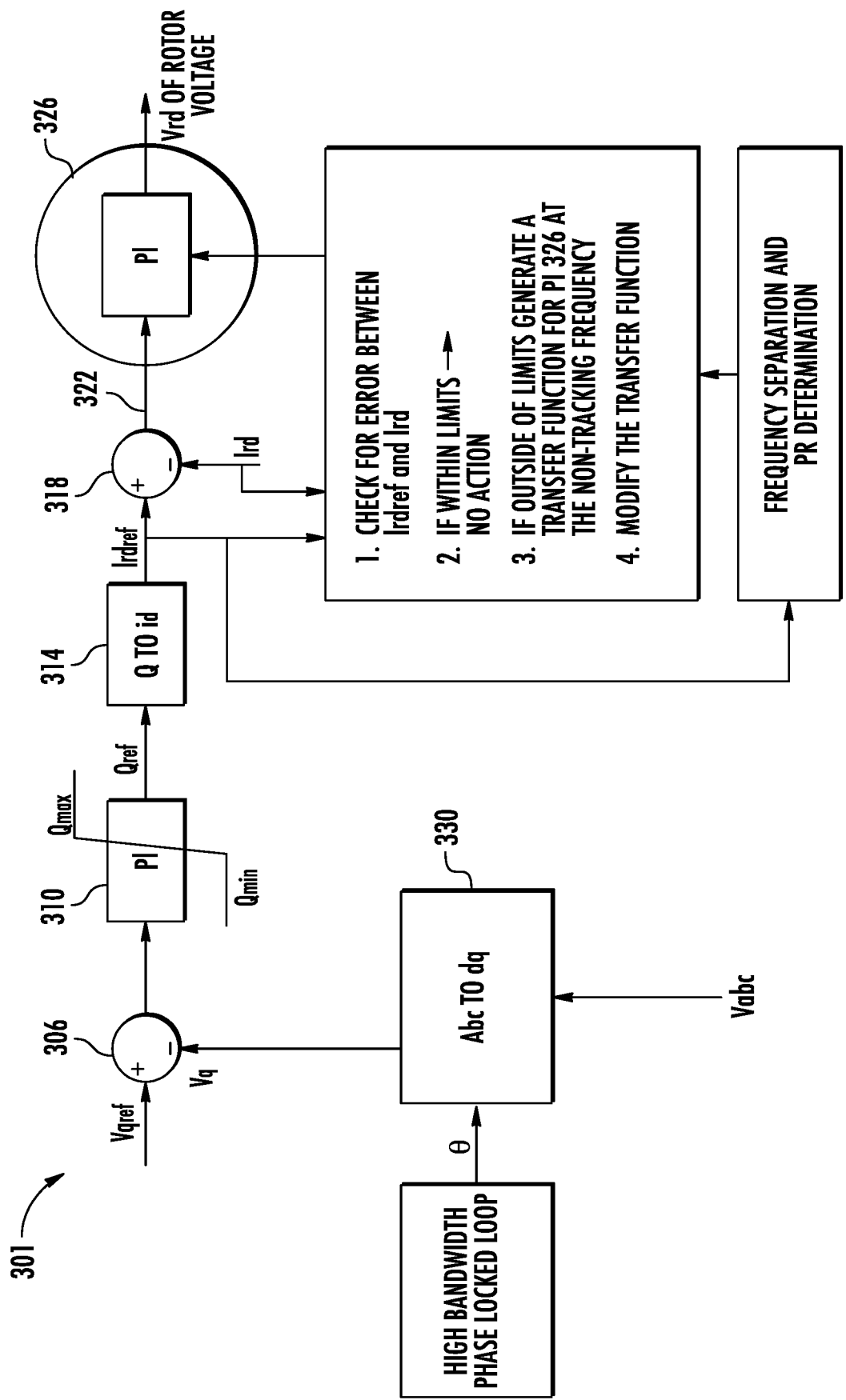
FIG. 12 illustrates a partial, detailed schematic diagram of the system for operating at least one inverter-based resource to provide grid-forming control thereof of FIG. 11.

The method 200 of FIG. 9 can now be better understood with reference to the system 300 illustrated in FIGS. 10-12. In particular, FIGS. 10-12 illustrate various control diagrams of one embodiment of the system 300 for mitigating voltage disturbances at a point of interconnection of a grid-forming inverter-based resource connected to a power grid due to a flicker effect. As shown, the system 300 provides a unique power regulator structure 302 (as compared to the convention power regulator 4 of FIG. 3). Further, as shown in the illustrated embodiment, the grid-forming inverter-based resource is the power converter 106, which is part of the wind turbine power system 100. Thus, in such embodiments, the system 300 is configured to generate and send one or more voltage control commands to the rotor-side converter 112 (as shown in FIG. 10).

In particular, as shown in FIGS. 10 and 11, the power regulator 302 of the converter controller 120 includes a voltage control loop 301 and a frequency control loop 303. In such embodiments, as shown, the voltage control loop corresponds to d-axis current control and the frequency control loop corresponds to q-axis control. In further embodiments, as shown in FIG. 11, the voltage control loop 301 of the converter controller 120 may include a d-axis power proportional-integral regulator 310 and a d-axis current proportional-integral regulator 326. In additional embodiments, the d-axis power proportional-integral regulator 310 and the d-axis current proportional-integral regulator 326 may include one of a proportional-integral regulator or a proportional-resonant regulator. Further, as shown, the power regulator 302 receives a frequency reference command $\omega_{ref}$ and a voltage reference command $V_{qref}$ from an external controller (e.g., from the farm-level controller 156).

More specifically, as shown in FIG. 12, a detailed schematic diagram of the voltage control loop 301 of the system 300 of FIG. 10 is illustrated, which particularly illustrates details of the dynamic controller for the grid-forming inverter based resource based on the voltage disturbances introduced by the voltage flicker. In particular, as shown, the voltage control loop 301 of the power regulator 302 receives a raw voltage signal Vabc in the a-b-c reference frame. Thus, as shown at 330, the raw voltage signal Vabc is rotated using a phase locked loop angle θ to the d-q reference frame to obtain the voltage feedback signal $V_q$. Accordingly, the flicker component is reflective in the voltage feedback signal $V_q$.

Moreover, as shown particularly in FIGS. 11 and 12 at 304 and 306, respectively, the frequency reference command $\omega_{ref}$ and the voltage reference command $V_{qref}$ may each be compared to a frequency feedback signal ω and the voltage feedback signal $V_q$, respectively. Thus, as shown in FIGS. 11 and 12, the comparisons from 304 and 306 can be regulated via respective power proportional-integral regulators 308, 310 having upper and lower limits (e.g., $P_{min}$, $P_{max}$, and $Q_{min}$, $Q_{max}$) to determine an active power reference signal $P_{ref}$ and a reactive power reference signal $Q_{ref}$. In addition, as shown in FIGS. 10-12 at 312 and 314, the system 300 can then generate d- and q-current vector reference signals (e.g., $Irq_{ref}$ and $Ird_{ref}$) from the active power reference signal $P_{ref}$ and a reactive power reference signal $Q_{ref}$, respectively. More specifically, as shown, the system 300 may calculate the current vector reference signals $Irq_{ref}$ and $Ird_{ref}$ as a function of the active power reference signal $P_{ref}$ and a reactive power reference signal $Q_{ref}$, respectively. In particular, in an embodiment, the generalized relationship between $P_{ref}$ and $Irq_{ref}$ may be given by Equation (1) below:

$$Irq_{ref} = (P_{ref}/1K_1 - V_d * Ird_{ref})/V_q \qquad \text{Equation (1)}$$

Where $K_1$ is a scalar gain,
$V_d$ and $V_q$ are voltage vectors in d-q transformation,
$Ird_{ref}$ and $Irq_{ref}$ are the current vectors in d-q transformation, and
$P_{ref}$ is the resultant real power component.

Typically, in vector control, one voltage vector (e.g., $V_d$) is made equal to zero during transformation and $V_q$ represents the voltage magnitude, which is a constant in steady state. Thus, Equation (1) is simplified according to Equation (2) below:

$$Ird_{ref} = (P_{ref}/K_2) \qquad \text{Equation (2)}$$

Where $K_2$ is the new scalar gain used in the controller and is set to optimize the control action.

In a similar manner, the simplified relationship between $Ird_{ref}$ and $Q_{ref}$ can be obtained using Equation (3) below:

$$Ird_{ref} = (Q_{ref}/K_3) \qquad \text{Equation (3)}$$

Where $K_3$ is a scalar gain.

For example, as shown in FIGS. 11 and 12, as shown at 316 and 318, the system 300 can compare the current vector reference signals $Irq_{ref}$ and $Ird_{ref}$ to respective current vector feedback signals Irq and Ird, which are obtained after applying the d-q transformation to the a-b-c reference frame. In particular, as shown at 318 in FIG. 12, in an embodiment, the voltage control loop 301 can check for errors between the d-axis current vector reference signal $Ird_{ref}$ and the vector feedback signal Ird. In one embodiment, for example, the voltage control loop 301 may subtract the vector feedback signal Ird from the d-axis current vector reference signal $Ird_{ref}$ to determine the error. This error is also referred to herein as a frequency component. Thus, this frequency component of the d-axis current vector reference signal $Ird_{ref}$ can be used to control the flicker effect at the point of interconnection 155. Accordingly, in such embodiments, the proportional integral regulator 326 can track this frequency component to mitigate its effect. If the error is within prescribed limits, the voltage control loop 301 continues to operate as-is. However, if the error is outside of prescribed limits, then the voltage control loop 301 is configured to dynamically adjust or generate a new transfer function of the proportional integral regulator 326 based on the frequency component of the d-axis current vector reference signal $Ird_{ref}$.

Figure 13:
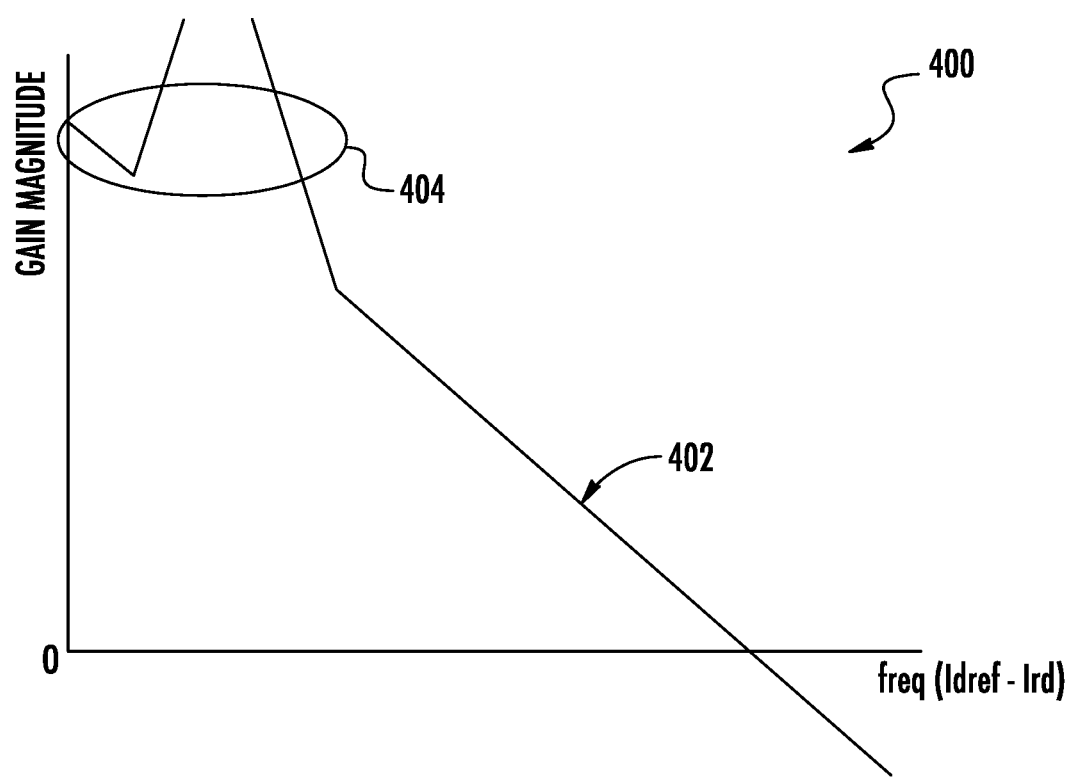
FIG. 13 illustrates a graph of gain magnitude (y-axis) versus frequency (x-axis) according to the present disclosure.

In particular embodiments, as shown in FIG. 13, a graph 400 of the gain magnitude (y-axis) versus frequency (x-axis) according to the present disclosure is provided. Thus, as shown, the frequency component (or error between the vector feedback signal Ird and the d-axis current vector reference signal $Ird_{ref}$) is represented by curve 402. Accordingly, as shown at 404, a region of the flicker component is illustrated based on a deviation from prescribed limits. Thus, in when region 404 is detected, the voltage control loop 301 can modify the transfer function of the proportional integral regulator 326 to mitigate the flicker component and bring the frequency back within acceptable limits.

Referring back to FIGS. 11 and 12, in certain embodiments, the current vectors (i.e., the outputs 320, 322) change to correct for an deviation in the frequency and/or voltage in the power grid. In particular, the outputs 320, 322 from the comparisons can be regulated via proportional integral regulators 324, 326 to determine voltage vector commands Vrq and Vrd. As shown at 328 of FIGS. 10 and 11, the d-q reference frame of the voltage vector commands Vrq and Vrd can then be rotated back to the a-b-c reference frame using a phasor angle θ to obtain at least one voltage control command(s) (e.g., Vrinvabc) for the inverter-based resource. Accordingly, the power regulator 302 operates the inverter-based resource based on the voltage control command(s) such that the inverter-based resource actively participates in controlling voltage and/or frequency at a point of interconnection between the inverter-based resource and the power grid in a closed loop manner.

Further aspects of the invention are provided by the subject matter of the following clauses:

Clause 1. A method for mitigating voltage disturbances at a point of interconnection of a grid-forming inverter-based resource connected to a power grid due to a flicker effect, the method comprising:

receiving, via a controller, a voltage reference command and a voltage feedback from an external controller, the voltage feedback containing information indicative of the voltage disturbances at the point of interconnection due to the flicker effect;

determining, via the controller, a power reference signal for the inverter-based resource based on the voltage reference command and the voltage feedback;

generating, via the controller, a current vector reference signal based on the power reference signal, the current vector reference signal containing a frequency component of the voltage disturbances;

generating a transfer function of a regulator of the controller based on the frequency component to account for the flicker effect;

generating, via the controller, a current vector based on a comparison of the current vector reference signal and a current vector feedback signal; and regulating, via the regulator, a voltage vector command using the current vector to mitigate the voltage disturbances at the point of interconnection.

Clause 2. The method of clause 1, further comprising dynamically adjusting the transfer function of the regulator of the controller based on the frequency component.

Clause 3. The method of clause 2, wherein the grid-forming inverter-based resource is a power converter.

Clause 4. The method of clause 3, wherein the controller comprises a converter controller of the power converter.

Clause 5. The method of clause 4, wherein the converter controller comprises voltage control loop and a frequency control loop, wherein the voltage control loop corresponds to d-axis current control and the frequency control loop corresponds to q-axis control or vice versa.

Clause 6. The method of clause 5, wherein the voltage control loop of the converter controller comprises a d-axis power proportional-integral regulator and a d-axis current proportional-integral regulator, wherein dynamically adjusting the transfer function of the controller based on the frequency component further comprises adjusting the transfer function of the d-axis current proportional-integral regulator based on the frequency component.

Clause 7. The method of clause 6, wherein dynamically adjusting the transfer function of the controller based on the frequency component further comprises adjusting the transfer function of the d-axis current proportional-integral regulator from a proportional-integral regulator to a proportional-resonant regulator.

Clause 8. The method of clauses 6-7, further comprising tracking, via the d-axis current proportional-integral regulator, the frequency component of the voltage disturbances.

Clause 9. The method of clause 8, further comprising dynamically adjusting the transfer function of the controller based on changes in the frequency component of the voltage disturbances.

Clause 10. The method of clause 4, further comprising determining, via the converter controller, one or more voltage control commands for the power converter by rotating a d-q reference frame of the current vector back to an a-b-c reference frame using a phasor angle.

Clause 11. The method of clause 10, wherein the grid-forming inverter-based resource is part of a wind turbine power system and the power converter comprises a rotor-side converter and a line-side converter, the method further comprising sending the one or more voltage control commands to the rotor-side converter.

Clause 12. The method of any of the preceding clauses, wherein the power reference signal comprises a reactive power reference signal or an active power reference signal.

Clause 13. A method for mitigating voltage disturbances at a point of interconnection of a grid-forming inverter-based resource connected to a power grid due to a flicker effect, the method comprising:
receiving, via a controller, a voltage feedback from an external controller;
generating, via the controller, a current vector reference signal based on the voltage feedback, the current vector reference signal containing a frequency component of the voltage disturbances;
dynamically adjusting a transfer function of a regulator of the controller based on the frequency component to account for the flicker effect; and
regulating, via the regulator, a voltage vector command of the grid-forming inverter-based resource to mitigate the voltage disturbances at the point of interconnection.

Clause 14. A system for mitigating voltage disturbances at a point of interconnection of a grid-forming inverter-based resource connected to a power grid due to a flicker effect, the system comprising:
a controller comprising a proportional-integral regulator, the controller comprising a processor for performing a plurality of operations, the plurality of operations comprising:
  receiving a voltage feedback from an external controller;
  generating a current vector reference signal based on the voltage feedback, the current vector reference signal containing a frequency component of the voltage disturbances; and
  generating a transfer function of the proportional-integral regulator based on the frequency component to account for the flicker effect,
  wherein the regulator of the controller regulates a voltage vector command of the grid-forming inverter-based resource to mitigate the voltage disturbances at the point of interconnection.

Clause 15. The system of clause 14, wherein the plurality of operations further comprise dynamically adjusting the transfer function of the regulator of the controller based on the frequency component.

Clause 16. The system of clauses 14-15, wherein the grid-forming inverter-based resource is a power converter.

Clause 17. The system of clause 16, wherein the controller comprises a converter controller of the power converter, wherein the converter controller comprises voltage control loop and a frequency control loop, wherein the voltage control loop corresponds to d-axis current control and the frequency control loop corresponds to q-axis control.

Clause 18. The system of clause 17, wherein the voltage control loop of the converter controller comprises a d-axis power proportional-integral regulator and a d-axis current proportional-integral regulator.

Clause 19. The system of clause 18, wherein dynamically adjusting the transfer function of the proportional-integral regulator the controller based on the frequency component further comprises adjusting the transfer function of the d-axis current proportional-integral regulator based on the frequency component.

Clause 20. The system of clause 19, wherein the d-axis power proportional-integral regulator and the d-axis current proportional-integral regulator comprise one of a proportional-integral regulator or a proportional-resonant regulator.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for mitigating voltage disturbances at a point of interconnection of a grid-forming inverter-based resource connected to a power grid due to a flicker effect, the method comprising:
receiving, via a controller, a voltage reference command and a voltage feedback from an external controller, the voltage feedback containing information indicative of the voltage disturbances at the point of interconnection due to the flicker effect;
determining, via the controller, a power reference signal for the inverter-based resource based on the voltage reference command and the voltage feedback;
generating, via the controller, a current vector reference signal based on the power reference signal, the current vector reference signal containing a frequency component of the voltage disturbances;
generating a transfer function of a regulator of the controller based on the frequency component to account for the flicker effect;
generating, via the controller, a current vector based on a comparison of the current vector reference signal and a current vector feedback signal;
regulating, via the regulator, a voltage vector command using the current vector to mitigate the voltage disturbances at the point of interconnection; and
dynamically adjusting the transfer function of the regulator of the controller based on the frequency component,
wherein dynamically adjusting the transfer function of the regulator of the controller based on the frequency component comprises adjusting the transfer function of a d-axis current proportional-integral regulator of a voltage control loop of the controller from a proportional-integral regulator to a proportional-resonant regulator.

2. The method of claim 1, wherein the grid-forming inverter-based resource is a power converter.

3. The method of claim 2, wherein the controller comprises a converter controller of the power converter.

4. The method of claim 3, wherein the converter controller comprises a frequency control loop, wherein the voltage control loop corresponds to d-axis current control and the frequency control loop corresponds to q-axis control or vice versa.

5. The method of claim 4, wherein the voltage control loop of the converter controller comprises a d-axis power proportional-integral regulator and the d-axis current proportional-integral regulator.

6. The method of claim 5, further comprising tracking, via the d-axis current proportional-integral regulator, the frequency component of the voltage disturbances.

7. The method of claim 6, further comprising dynamically adjusting the transfer function of the controller based on changes in the frequency component of the voltage disturbances.

8. The method of claim 3, further comprising determining, via the converter controller, one or more voltage control commands for the power converter by rotating a d-q reference frame of the current vector back to an a-b-c reference frame using a phasor angle.

9. The method of claim 8, wherein the grid-forming inverter-based resource is part of a wind turbine power system and the power converter comprises a rotor-side converter and a line-side converter, the method further comprising sending the one or more voltage control commands to the rotor-side converter.

10. The method of claim 1, wherein the power reference signal comprises a reactive power reference signal or an active power reference signal.

11. A method for mitigating voltage disturbances at a point of interconnection of a grid-forming inverter-based resource connected to a power grid due to a flicker effect, the method comprising:
  receiving, via a controller, a voltage feedback from an external controller;
  generating, via the controller, a current vector reference signal based on the voltage feedback, the current vector reference signal containing a frequency component of the voltage disturbances;
  dynamically adjusting a transfer function of a regulator of the controller based on the frequency component to account for the flicker effect; and
  regulating, via the regulator, a voltage vector command of the grid-forming inverter-based resource to mitigate the voltage disturbances at the point of interconnection,
  wherein dynamically adjusting the transfer function of the regulator of the controller based on the frequency component comprises adjusting the transfer function of a d-axis current proportional-integral regulator of a voltage control loop of the controller from a proportional-integral regulator to a proportional-resonant regulator.

12. A system for mitigating voltage disturbances at a point of interconnection of a grid-forming inverter-based resource connected to a power grid due to a flicker effect, the system comprising:
  a converter controller comprising a proportional-integral regulator, wherein the converter controller comprises a voltage control loop and a frequency control loop, wherein the voltage control loop comprises a d-axis power proportional-integral regulator and a d-axis current proportional-integral regulator, the converter controller comprising a processor for performing a plurality of operations, the plurality of operations comprising:
  receiving a voltage feedback from an external controller;
  generating a current vector reference signal based on the voltage feedback, the current vector reference signal containing a frequency component of the voltage disturbances;
  generating a transfer function of the proportional-integral regulator based on the frequency component to account for the flicker effect; and
  dynamically adjusting the transfer function of the proportional-integral regulator of the converter controller based on the frequency component,
  wherein the regulator of the converter controller regulates a voltage vector command of the grid-forming inverter-based resource to mitigate the voltage disturbances at the point of interconnection,
  wherein dynamically adjusting the transfer function of the proportional-integral regulator of the converter controller based on the frequency component comprises adjusting the transfer function of the d-axis current proportional-integral regulator from a proportional-integral regulator to a proportional-resonant regulator.

13. The system of claim 12, wherein the grid-forming inverter-based resource is a power converter.

14. The system of claim 13, wherein the converter controller is coupled to the power converter, wherein the voltage control loop corresponds to d-axis current control and the frequency control loop corresponds to q-axis control.

15. The system of claim 14, wherein the d-axis power proportional-integral regulator comprises a proportional-integral regulator or a proportional-resonant regulator.

* * * * *